United States Patent
Greenberg

(10) Patent No.: US 11,894,685 B1
(45) Date of Patent: Feb. 6, 2024

(54) SYSTEMS AND PROCESSES FOR PIPELINE TRANSPORT OF WATER USING MICRO HYDROELECTRIC TURBINES TO REDUCE ELECTRICITY DRAWN FROM THIRD-PARTY ELECTRICAL POWER GRIDS

(71) Applicant: Kenneth Greenberg, Castle Rock, CO (US)

(72) Inventor: Kenneth Greenberg, Castle Rock, CO (US)

(73) Assignee: Eddy Corp., Denver, CO (US)

( * ) Notice: Subject to any disclaimer, the term of this patent is extended or adjusted under 35 U.S.C. 154(b) by 0 days.

(21) Appl. No.: 17/835,939

(22) Filed: Jun. 8, 2022

Related U.S. Application Data

(60) Provisional application No. 63/233,926, filed on Aug. 17, 2021, provisional application No. 63/208,187, filed on Jun. 8, 2021.

(51) Int. Cl.
*H02J 3/38* (2006.01)
*H02K 7/18* (2006.01)

(52) U.S. Cl.
CPC ............ *H02J 3/381* (2013.01); *H02K 7/1823* (2013.01); *H02J 2300/24* (2020.01); *H02J 2300/28* (2020.01)

(58) Field of Classification Search
CPC .. H02J 3/381; H02J 3/382; H02J 3/383; H02J 3/386; H02J 2300/24; H02J 2300/28; H02K 7/1823

USPC .......................................................... 307/19
See application file for complete search history.

(56) References Cited

U.S. PATENT DOCUMENTS

2011/0248502 A1* 10/2011 Cripps ..................... E02B 9/02
290/52

OTHER PUBLICATIONS

Ali, Sajid and Choon-Man, "Optimum Design of Hybrid Renewable Energy System for Sustainable Energy Supply to a Remote Island", Sustainability 12, No. 3, 1280, Feb. 10, 2020.
"Generating Renewable Energy From Existing Infrastructure" [retrieved on May 13, 2022] www.canyonhydro.com/products/Generating-Renewable-Energy-from-Existing-Infrastructure.pdf.

* cited by examiner

*Primary Examiner* — Hal Kaplan
(74) *Attorney, Agent, or Firm* — Red Rocks Law, LLC

(57) ABSTRACT

Disclosed herein are unique systems and processes to transport water or fluids within pipelines by generating electricity along various portions of the water pipeline route using micro hydroelectric turbines (also referred to herein as mini-turbines) placed in-line inside of (or adjacent to/parallel with) the pipeline at one or more distances. The mini-turbines are connected via wiring systems to the pump stations at the bottom of declines in the pipeline to generate electricity via gravity flow of the water through the pipeline, and then provide such electricity to a pump to propel or pump the water up inclined portions of the pipeline route. In this manner, water or fluids can be transported from a first location to a second location along significant distances through a pipeline while reducing the electrical consumption from a third-party electrical power grid.

20 Claims, 6 Drawing Sheets

SYSTEMS AND PROCESSES FOR PIPELINE TRANSPORT OF WATER USING MICRO HYDROELECTRIC TURBINES TO REDUCE ELECTRICITY DRAWN FROM THIRD-PARTY ELECTRICAL POWER GRIDS

CROSS REFERENCES OF RELATED APPLICATIONS

This application claims priority to, and the benefit of under 35 U.S.C. 119(e), U.S. Provisional Patent Application No. 63/208,187 filed Jun. 8, 2021 entitled "A UNIQUE PROCESS TO CREATE ELECTRICITY ALL ALONG THE DOWNHILL PORTION OF ANY PIPELINE ROUTE USING MICRO-HYDROELECTRIC TURBINES PLACED INSIDE OF, OR ADJACENT AND CONNECTED BY SMALLER PIPING TO, THE PIPELINE AND AT INTERMITTENT DISTANCES. THE MINI TURBINES WOULD BE CONNECTED VIA WIRING SYSTEMS TO THE PUMP STATIONS AT THE BOTTOM OF THE DECLINE TO PROVIDE ELECTRICITY TO PROPEL OR PUMP THE WATER UP ANY INCLINE PORTION OF THE PIPELINE ROUTE", and U.S. Provisional Patent Application No. 63/233,926 filed Aug. 17, 2021 entitled "SYSTEMS AND PROCESSES FOR PIPELINE TRANSPORT OF WATER USING MICRO HYDROELECTRIC TURBINES TO REDUCE ELECTRICITY DRAWN FROM THIRD-PARTY ELECTRICAL POWER GRIDS"; both U.S. Provisional Patent Applications are incorporated herein by reference in their entirety.

TECHNICAL FIELD

This application generally relates to transporting water through pipelines.

BACKGROUND

To date, conventional pump and pipeline systems that take water to higher elevations to reservoirs to generate electricity as the water flows downhill, can consume significant electricity amounts from third-party electrical power grids at great expense to the pipeline owner. Moreover, many of these electrical power grids are carbon-based.

SUMMARY

As recognized by the present inventor, what is needed are systems and methods for reducing the amount of electricity used from third-party electrical power grids to power the transport of water or fluids through pipelines. According to one broad aspect of one embodiment of the present disclosure, disclosed herein are unique systems and processes to transport water or fluids within pipelines by generating electricity along one or more portions of the pipeline route using micro hydroelectric turbines (also referred to herein as mini-turbines) placed inside of (or placed adjacent/in-parallel to) the pipeline at intermittent distances. The mini-turbines are connected via wiring systems to the pump stations at the bottom of declines in the pipeline to generate electricity via gravity flow of the water through the pipeline, and then provide such electricity to a pump to propel or pump the water up inclined portions of the pipeline route. In this manner, water or fluids can be transported from a first location to a second location along significant distances through a pipeline while reducing the electrical consumption from third-party electrical power grids. One or more wind turbines and/or solar panels with battery storage may optionally be included to generate additional electricity to power the pumps.

Embodiments of the present disclosure can be used in relations to the transport water or fluids in relations to water systems, water pipelines, water treatment facilities, sewage facilities, and the like.

According to another broad aspect of one embodiment of the present disclosure, disclosed herein is a system for providing renewable electrical power for transporting water from a first location to a second location through a water pipeline having one or more pumps operating with an electrical power grid. In one example, the system may include at least one micro-turbine fluidly coupled with the water pipeline, wherein the micro-turbine is located along a down-sloped portion of the pipeline, the micro-turbine generating electricity as water passes through the micro-turbine, the micro-turbine having an electrical output coupled with the one or more pumps to provide electricity to the one or more pumps; and a controller coupled with the micro-turbine, the controller monitoring the electrical demands of the one or more pumps, the controller monitoring the electrical output of the micro-turbine, and if power is available from the micro-turbine, the controller directing power from the micro-turbine to the one or more pumps to pump the water through the pump towards the second location thereby reducing an amount of electricity consumed from the electrical power grid.

In one example, the micro-turbine is positioned in-line within the pipeline. In another example, the micro-turbine is positioned in parallel with the pipeline and the micro-turbine is fluidly coupled with the pipeline.

In one embodiment, the micro-turbine is located near a bottom end of the down-sloped portion of the pipeline.

In another example, the system may also include one or more solar panels, and one or more rechargeable batteries receiving and storing the electrical power generated by the solar panels, wherein the output of the batteries is electrically coupled with the pump to provide electricity stored from the one or more solar panels to the one or more pumps.

In another embodiment, the system may also include one or more wind turbines, and one or more rechargeable batteries receiving and storing the electrical power generated by the wind turbines, wherein the output of the batteries is electrically coupled with the pump to provide electricity stored from the wind turbines to the one or more pumps.

In another example, the system also may include one or more solar panels, one or more wind turbines, and one or more rechargeable batteries receiving and storing the electrical power generated by the solar panels and the wind turbines, wherein the output of the batteries is electrically coupled with the pump to provide electricity stored from the wind turbines and the solar panels to the one or more pumps.

In one embodiment, the water pipeline and pumps are part of a water reservoir, a water treatment system, a sewage system, or other water or fluid system.

According to another broad aspect of one embodiment of the present disclosure, disclosed herein is a method for providing renewable electrical power for transporting water from a first location to a second location through a water pipeline having one or more pumps operating with an electrical power grid. In one example, the method may include providing at least one micro-turbine fluidly coupled with the water pipeline; positioning the micro-turbine along a down-sloped portion of the pipeline; connecting an electrical output of the micro-turbine to the pump; generating electricity within the micro-turbine as water passes through the micro-turbine; monitoring the electrical demands of the one or more pumps; and if power is available from the micro-turbine, directing power from the micro-turbine to the one or more pumps to pump the water through the pump towards the second location thereby reducing an amount of electricity consumed from the electrical power grid.

In one example, the providing operation positions the micro-turbine in-line within the pipeline, or the providing operation positions the micro-turbine in parallel with the pipeline and fluidly couples the micro-turbine with the pipeline.

In one embodiment, the positioning operation locates the micro-turbine near a bottom end of the down-sloped portion of the pipeline, or at another location along the downslope of the pipeline.

In another embodiment, the method may also include providing one or more solar panels; providing one or more rechargeable batteries configured to receive and store electrical power generated by the solar panels; and electrically coupling the output of the batteries with the pump to provide electricity stored from the one or more solar panels to the one or more pumps.

In another example, the method may also include providing one or more wind turbines; providing one or more rechargeable batteries configured to receive and store electrical power generated by the wind turbines; and electrically coupling the output of the batteries with the pump to provide electricity stored from the wind turbines to the one or more pumps.

In another embodiment, the method may also include providing one or more solar panels; providing one or more wind turbines; providing one or more rechargeable batteries configured to receive and store electrical power generated by the solar panels and the wind turbines; and electrically coupling the output of the batteries with the pump to provide electricity stored from the wind turbines and the solar panels to the one or more pumps.

In one example, the water pipeline and pumps are part of a water reservoir, a water treatment system, a sewage system, or other water or fluid system.

Other embodiments of the disclosure are described herein. The features, utilities and advantages of various embodiments of this disclosure will be apparent from the following more particular description of embodiments as illustrated in the accompanying drawings.

DETAILED DESCRIPTION

Figure 1:
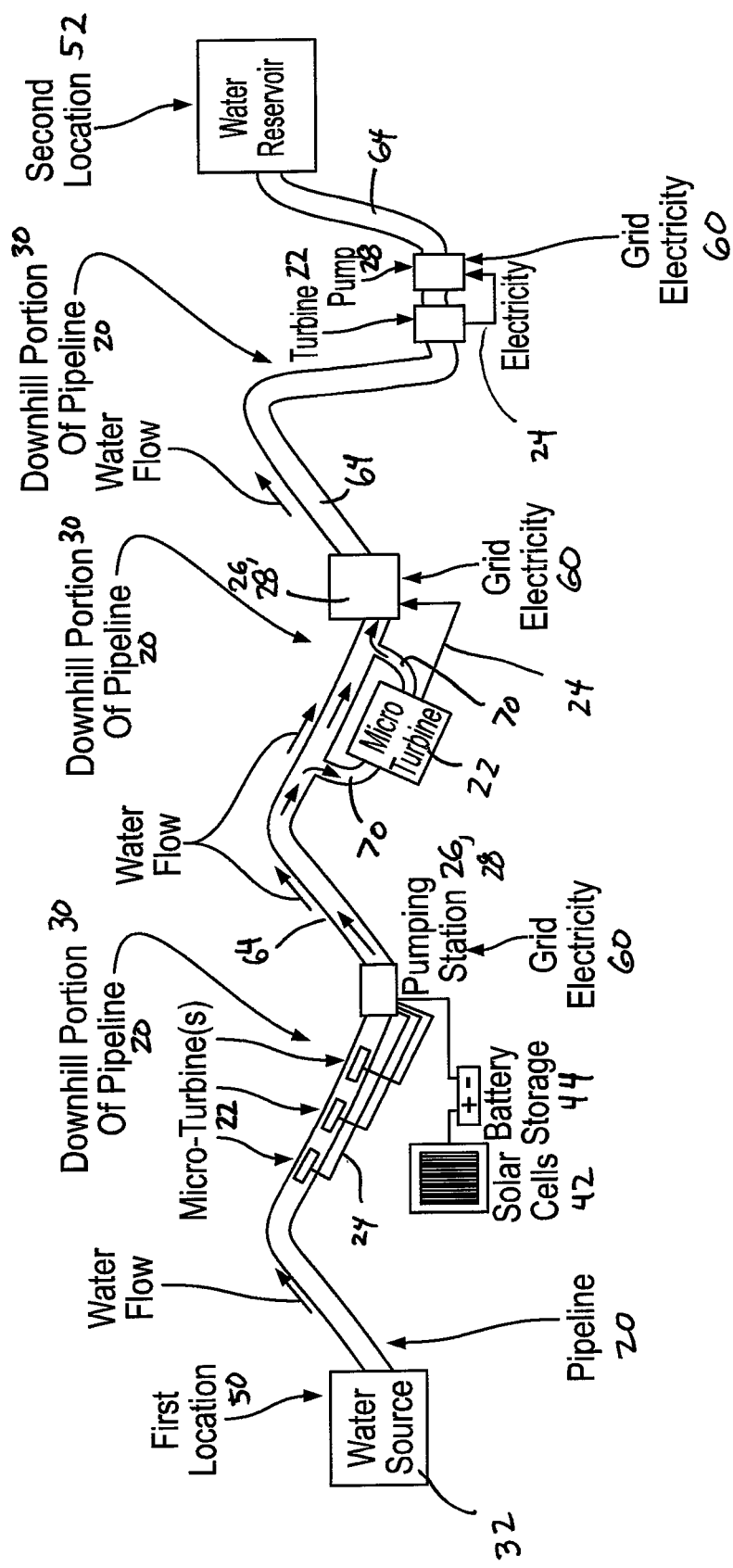
FIG. 1 illustrates an example of a block diagram of a system for transporting water from a first location with a water source such as a river (or other water source) to a second location such as water storage reservoir while reducing the electricity used from a third-party electrical power grid, in accordance with various embodiments of the present disclosure.

Disclosed herein are unique systems and processes to generate electricity along various portions of water or fluid pipeline 20 routes using one or more micro hydroelectric turbines 22 (also referred to herein as mini-turbines) placed inside of (or adjacent to/in parallel with) the pipeline 20 at intermittent distances. The mini-turbines 22 are electrically connected via insulated high voltage electrical wiring 24 to one or more water or fluid pump stations 26 (having one or more water pumps 28 therein) at the bottom of declines 30 of the pipeline to generate electricity via gravity flow of the water 32 through the pipeline 20, and then provide such electricity to one or more water pumps 28 to propel or pump the water or fluids 32 through subsequent flat portions and inclined portions of the pipeline route. As disclosed herein, the hydroelectric turbines 22 can be located along down sloping portions 30 of the pipeline 20, or at the bottom of down sloping portions 30 of the pipeline 20. Other renewable energy sources (optional) can also be electrically connected with water pump(s) to provide other electricity sources to power the water pump(s), such as wind turbines 40, solar panels 42, and rechargeable batteries 44.

In this manner, water 32 can be transported from a first location 50 to a second location 52 along significant distances through a pipeline 20 using the energy generated by the mini-turbines 32 and/or the wind turbines 40, solar panels 42 (and in any combination with electricity from the electrical grid 60), thereby reducing electrical consumption from third-party electrical power grids 60. For instance, embodiments of the present disclosure can be used to transport water 32 from rivers to artificial reservoirs built specifically for larger hydroelectric installations and plants—without damming the rivers. Embodiments of the disclosure can also be used for closed-loop upper and lower reservoirs often called Pumped Storage Plants. Embodiments of the present disclosure can also be used to produce electricity and to deliver water 32 for irrigation, drinking, and other uses. Embodiments of the present disclosure can be used in relations to the transport water or fluids 32 in relations to water systems, water pipelines, water treatment facilities, sewage facilities, and the like. Various examples of embodiments of the present disclosure are described herein.

The detailed description herein refers to the accompanying drawings that depict various details of examples selected to show how particular embodiments may be implemented. The discussion herein addresses various examples of the inventive subject matter at least partially in reference to these drawings and describes the depicted embodiments in sufficient detail to enable those skilled in the art to practice the embodiments. Many other embodiments may be utilized for practicing the subject matter other than the illustrative examples discussed herein, and many structural and operational changes in addition to the alternatives specifically discussed herein may be made without departing from the scope of the disclosed subject matter.

FIGS. 1-6 illustrate various aspects of the present disclosure. Referring to FIG. 1, an embodiment of the present disclosure is illustrated to transport water 32 from a first location 50 with a water source such as a river (or other water source) to a second location such as water storage reservoir. In this example, a pipeline 20 is provided from the first location 50 to the second location 52. Along the route from the first location 50 to the second location 52, the pipeline 20 has level/flat portions 62, uphill portions 64 and downhill portions 30. Pump stations 26 (having water pumps 28 therein) are provided at or near the lower points of the downhill portions 30 of the pipeline 20 to pump the water 32 through the uphill 64 and flat portions 62 of pipeline 20.

In accordance with one embodiment of the present disclosure, one or more micro hydroelectric turbines 22 are provided along the downhill portions 30 of the pipeline 20 and electrically connected with the pump stations 26 through insulated electrical wiring 24. As described herein, these micro hydroelectric turbines 22 are positioned along the downhill portions 30 of the pipeline 20 or at the ends of a downhill portion 30 of the pipeline 20, and the micro hydroelectric turbines 22 can be positioned in-line within the pipeline 20, integrated within the pipeline 20 (or fluidly connected in parallel with or adjacent to the pipeline 20 as described below)—so that as gravity moves the water 32 through the pipeline 20, the water 32 moves through the micro hydroelectric turbines 22 thereby activating or energizing the micro turbines 22 to generate electricity. This generated electricity may be used to provide electricity/power to the pump stations 26 to pump the water 32 through a subsequent portion of the pipeline 20.

In another embodiment and as shown in FIGS. 1 and 4-6, one or more micro hydroelectric turbines 22 will be positioned outside of and adjacent to or in parallel with the pipeline 20, and additional fluid conduits/pipes 70 are used to fluidly couple the pipeline 20 to the entry port of the micro hydroelectric turbine 22, and additional conduits/pipes 70 are provided to fluidly couple the exit port of the micro hydroelectric turbine 22 with the pipeline 20 to bring the water 32 back into the pipeline 20 upon exit from the micro turbine 22.

In one embodiment, each section of pipeline 20 with a micro hydroelectric turbine 22 may have a port located on the outside to access the micro hydroelectric turbine 22 for maintenance, repair, and electrical wiring.

The configurations shown in FIGS. 1-6 can be repeated throughout one or more sections of the pipeline 20 between the first location 50 and the second location 52. In the example of FIG. 1, micro hydroelectric turbines 22 are each electrically coupled with a corresponding pump station 26 at three different positions/locations along the pipeline 20 between the first location 50 of the river and the second location 52 of the water storage reservoir.

In this manner, water or fluids 32 can be transported from the first location 50 to the second location 52 across significant distances through the pipeline 20, and the electrical energy generated by the micro hydroelectric turbines 22 is used to power the water pumping stations 26 to thereby reduce the electrical consumption of the pump stations 26 from a third-party electric power grid 60.

In another example as shown in FIG. 1, turbine systems 22 are provided at the bottom or end of downslopes 30 of the pipeline 20. These turbine systems 22 may include, for instance as an example, a 12,000 kW system including two Canyon Hydro Pelton-style turbines, operating under 370 meters (1,214 feet) net head. For water pumps 28 with smaller electrical needs and where there is less elevation loss in a pipeline route, an example of a turbine 22 that can be utilized is the 910 kW Francis-style turbine, operating for instance under 42.7 meters (140 feet) net head.

In another example and as shown in FIGS. 1-6, solar cells 42 can be provided and electrically coupled to electrical storage 44 such as one or more batteries, so that the solar cells 42 provide energy into the batteries 44. The solar cells 42 may be mounted near or on the pipelines 20 or near or on the pump stations 26, and the batteries 44 can be electrically coupled with the solar cells 42 and with the water pumps 28, so that the batteries 44 provide additional electrical energy to the water pumps 28 at the pump stations 26. In another example, the electrical output of the solar cells 42 can also be coupled with the water pump(s) 28 if desired.

As described herein, the electricity/power generated by the micro hydroelectric turbines 22 (as well as the electricity generated by the solar cells 42 and rechargeable batteries 44) is used to power the water pump(s) 28 in the pump station 26, in order to reduce the amount of electricity/power drawn by the water pumps 28 from a third-party electrical power grid 60. In this way, embodiments of the present disclosure can provide renewable energy sources to supply amounts of electricity used to transport water 32 by water pumps 28 through a pipeline 20 between two locations.

Embodiments of the present disclosure can also be used to deliver water or fluids 32 from the second location 52 to other locations. In one example, additional combinations of micro hydroelectric turbines 22 and water pumping stations 26 can be used to transport water or fluids 32 to other locations, wherein the micro hydroelectric turbines 22 are positioned within a delivery pipeline 20 (or fluidly coupled with the pipeline 20) and electrically coupled with a corresponding water pumping station 26 to provide the pumping station 26 with electrical energy/power generated by the micro hydroelectric turbines 22.

For instance, after usage in the main reservoir, water 32 could then be pumped through an extension of the pipeline 20 to irrigation systems and municipal water systems in drought-stricken areas. As described, this section of the pipeline can also be configured with embedded micro-hydroelectric turbines 22, thus generating electricity all along the route for any further pumping needs.

In one example of the present disclosure, in-line turbines 22 are placed along the downslope 30 route of a water pipeline 20. The electricity produced by the micro hydroelectric turbines 22 is electrically coupled with one or more water pump stations 26 for any upslope section 64 and/or level section 62 of the pipeline 20. The number of turbines 22 needed will depend upon factors such as the size of the pipeline 20 and the length of the downslope 30 or length of the pipeline 20. One goal of an embodiment of the present disclosure is to reduce the net amount of electricity used by the system from the external electrical power grid 60.

In one embodiment, if the amount of power generated from a micro turbine 22 in a downline section 30 of a pipeline 20 is less than required for the next pumping station, more in-line micro hydroelectric turbines 22 can be added or inserted within the pipeline 20 or added in parallel to the pipeline 20 to supplement and/or increase the amount of electrical power generated for the sub-section of the pipeline.

Figure 3:
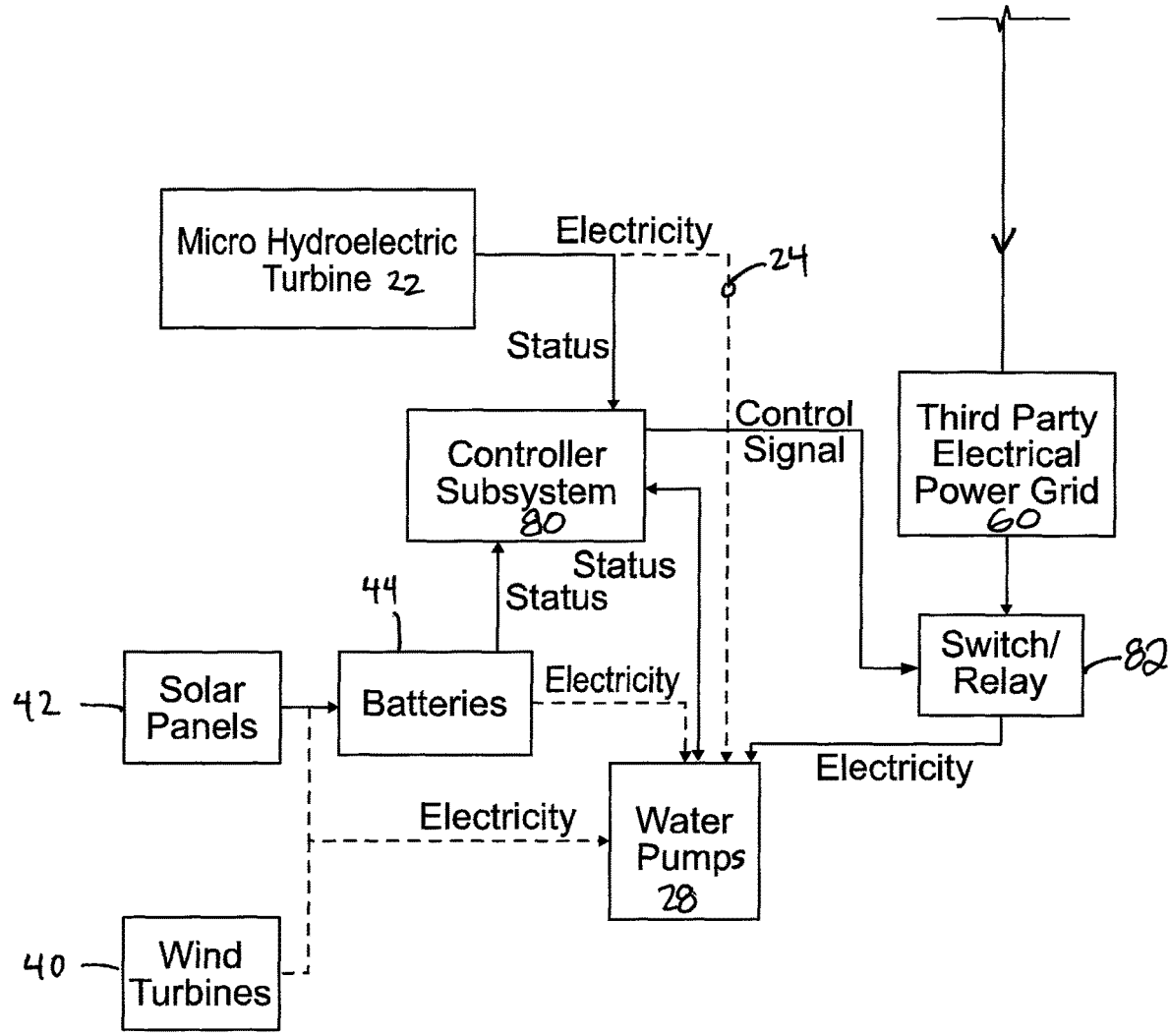
FIG. 3 illustrates an example of a block diagram of a controller monitoring the electricity from a micro hydro-electric turbine, solar panels and batteries, and the controller selectivity regulating the use of electricity from a third-party electrical power grid, to efficiently provide electricity to a water pump, in accordance with various embodiments of the present disclosure.

In another embodiment, the electrical outputs of the micro turbines 22 may be coupled with energy storage devices 44 such as rechargeable batteries, so that the energy generated by the micro turbines 22 can be drawn upon at a later time to power the water pumps 28. As shown in FIG. 3, a controller or computer 80 can be provided to monitor and control the distribution of electrical power from the micro turbines 22, from the solar cell 42 (if present), from the wind turbine(s) 40 (if present), and from the batteries 44 (if present), to the water pumps 28. The controller 80 may utilize low power computing devices and may implement one or more of the operations, features or functions described herein, and may be configured to provide additional features such as system status monitoring, reporting, diagnostics, and communications.

Figure 2:
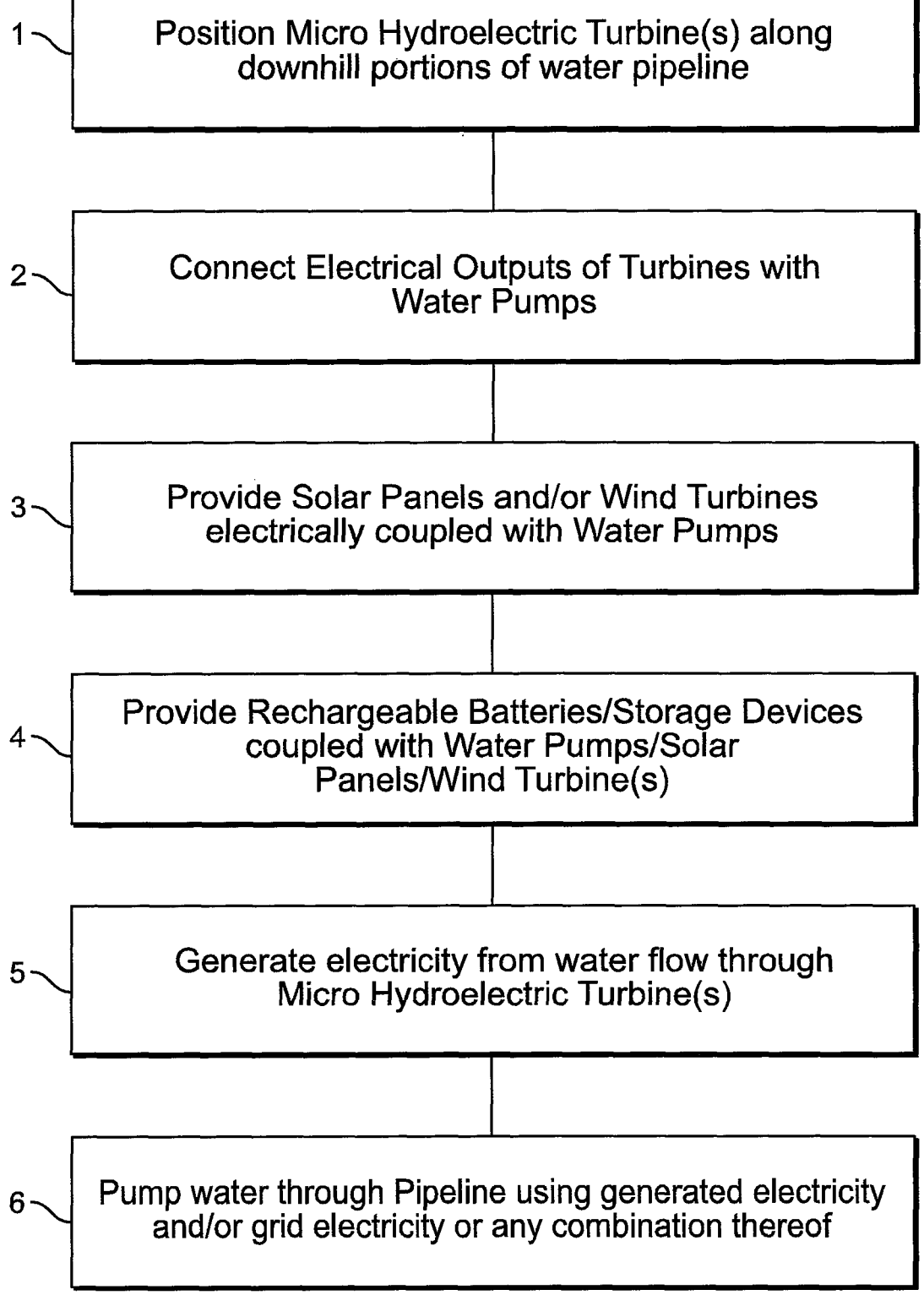
FIG. 2 illustrates an example of a process for transporting water from a first location to a second location through a water pipeline while reducing the electricity used from a third-party electrical power grid, in accordance with various embodiments of the present disclosure.

Now referring to FIG. 2 and according to another aspect of an embodiment of the present disclosure, FIG. 2 illustrates an example of a method or process for transporting water or fluids 32 from a first location 50 to a second location 52 through a pipeline 20 while reducing the amount of electricity used from third-party electrical grids 60.

At operation 1, one or more micro hydroelectric turbines 32 are provided and positioned in-line within, or adjacent to, a pipeline 20 along a downhill portion 30 of the pipeline 20 or at the end of a downhill portion 30 of the pipeline 20.

At operation 2, the electrical outputs of the one or more micro hydroelectric turbines 22 are electrically coupled (either directly or indirectly) with one or more water pumps 28.

At operation 3, one or more solar panels or solar cells 42, and/or one or more wind turbines 40, are provided and are electrically coupled (either directly or indirectly) with one or more water pumps 28. The solar panels/solar cells 42 capture solar energy and convert that energy into electrical energy for use by the water pumps 28. The wind turbines 40 covert wind into electric energy for use by the water pumps 28. In some embodiments, one or more wind turbines 40 are provided and electrically coupled with the water pumps 28 to provide electricity to the water pumps; in other embodiments, one or more solar panels 42 are provided and electrically coupled with the water pumps 28 to provide electricity to the water pumps; and in other embodiments one or more wind turbines 40 and one or more solar panels 42 are provided and electrically coupled with the water pumps 28 to provide electricity to the water pumps. This operation is optional if desired.

At operation 4, one or more electrical storage devices 44, such as rechargeable batteries and/or capacitors and or other storage devices, are electrically coupled with the electrical outputs of the solar panels/cells 42 (if present) and with the electrical outputs of the one or more wind turbines 40 (if present), and the electrical storage devices 44 may also be coupled with the electrical outputs of the one or more micro hydroelectric turbines 22. The electrical storage devices 44 are electrically coupled with and provide energy storage, electrical backup, or supplemental electrical energy to the water pumps 28. This operation is optional if desired.

At operation 5, electricity is generated by water traveling through a downhill portion 30 of the pipeline 20 and through the one or more micro hydroelectric generators 22 provided by operation 1.

At operation 6, the electricity generated by operation 5 (and if desired, the electricity generated by operations 3-4) is applied and used to provide power/electricity to one or more of the water pumps 28 (i.e., at the pump station 26) to pump water forward through the pipeline 20. If additional electricity is needed to power the water pumps 28 beyond the electricity provided by the turbines 22 (and the optional solar panels 42, wind turbines 40 and batteries 44), such electricity may be provided from a power source such as a third-party electrical grid 60 as shown in FIGS. 1 and 3-6. In this manner, at any time the water pump(s) 28 may be powered using electricity from the one or more micro hydroelectric turbines 22, solar panels 42, wind turbines 40, battery storage/backup 44, or third-party electric power grid 60, or any combination thereof depending on real-time conditions. In one example, operation 6 may be implemented by one or more controllers 80 with relays/switches/regulators 82, as disclosed herein, for instance as shown in the example of FIG. 3.

Operations 1-6 may be repeated along various portions of the water pipeline 20 between the first 50 and second location 52, to move the water 32 through the pipeline 20. In this manner, it can be seen that water/fluids 32 can be transported along the pipeline 20 from a first location 50 to a second location 52 while reducing the amount of electricity drawn from the third-party electrical power grid 60.

FIG. 3 illustrates an example of a block diagram of an embodiment of the present disclosure. As shown in FIG. 3, a controller 80 (shown as controller subsystem) is provided and monitors the electrical demand or electrical needs of the water pump(s) 28. The controller 80 also monitors the electricity produced by the micro hydroelectric turbine(s) 22, as well as the electricity available from the solar panels 42, wind turbines 40, and the batteries 44. The controller 80 also controls a switch 82 (or regulator or relay or the like) which can selectively apply electricity from a third-party electrical power grid 60 to supply power to the water pump(s) 28, or can apply electricity to the water pump(s) 28 from any combination of power sources such as from the one or more micro hydroelectric turbines 22, solar panels 42, wind turbines 40, battery storage/backup 44, or third-party electric power grid 60, or any combination thereof depending on real-time conditions. The controller 80 can include one or more computers or processors (such as programmable logic controllers (PLCs) or the like) and can include other hardware such as power converters (i.e., DC/AC), relays, switches, regulators, level shifters, and other electronics, and the controller 80 can implement one or more of the operations, functions or features as described herein.

In one example of the present disclosure, existing water pipelines can be retrofitted with embodiments of the present disclosure. In another example, new pipelines can be built to include with one or more embodiments of the present disclosure, with sufficient inline or external micro-hydroelectric turbines 22. Insulated waterproof wiring enclosures 24 can then be provided and connected between the micro hydroelectric turbines 22 and one or more water pumps 28 in order to power the pumps.

In one example, the pumping stations 26 may be provided by the pipeline owner or may already be in place.

Embodiments of the present disclosure can be used anyplace where water/fluids 32 flow downhill. If existing downslope water trenches, canals or tunnels are in use, those can also be fitted with inline micro electric turbines 22 with the electrical wiring 24 to connecting the turbines 22 with the next pumping station 26.

Embodiments of the present disclosure may be used to take water 32 from rivers without damming the rivers and with an efficient electricity usage from the grid 60, to artificial reservoirs built specifically for larger hydroelectric installations and plants.

Embodiments of the present disclosure may also be used for closed-loop upper and lower reservoirs often called Pumped Storage Plants. The upslope 64 water pump station 26 would be electrically powered by the downslope pipeline portion 30 retrofitted with micro-hydroelectric turbines such as described herein. In this manner, the Pumped Storage Plant systems can then be a producer of grid electricity instead of a consumer of grid electricity.

Embodiments of the present disclosure may be used in or with a variety of different applications, environments, and systems—such as but not limited to municipal water systems, pump storage systems, large pipeline and large reservoir applications such as for North American Water and Power Alliance (NAWPA) pipelines, irrigation systems, existing water tunnel systems, large hydroelectric reservoirs, drought-stricken reservoirs, water treatment facilities, sewage facilities, or other fluid transport systems.

Described herein are non-limiting examples of micro hydroelectric turbines 22 that can be used. It is understood that other hydroelectric turbines 22 can be used if desired, beyond those described herein, without departing from the present disclosure. In these examples, the water pipeline 22 is assumed to have a 36" diameter. The pump system 28 at the bottom of a decline 30 may have the following properties and electricity power requirements: 22 DMX axially split, two-stage pumps (24×28) with driver sizes to 16,780 kW (22,500 hp) delivering 1.6 million bbl/d at heads to 625 m (2050 ft). Casing weights total equal 13,610 kg (30,000 lbs).

In one example with a 500 Ft. Elevation loss, ½ mile from the top of the pipeline route to the bottom of the pipeline route where turbine 22 and pump station 26 will reside; with a design flow of 35.45 cubic feet per second (cfs) developed by 2640 feet of 36" penstock, with a net head of 494 feet. In this example, a "Pelton turbine" micro hydroelectric turbine 22 from Canyon Hyrdo of Deming, Washington USA can be used with a 24" ball type turbine inlet valve with gear operator, 24" restrained dismantling joint, Canyon Hydro five nozzle vertical Pelton turbine with hydraulic actuation, 1350kW-4160VAC-600RPM synchronous generator, hydraulic power unit, switchgear and controls panels for automated grid parallel operation and structural steel equipment mounting frames. Expected system output from this micro hydroelectric turbine 22 under the design conditions above is 1255 kW.

In another example, with a 1000 Ft. Elevation loss 1 mile from the top of the pipeline route to the bottom of the pipeline route where turbine 22 and pump station 26 will reside; with a design flow of 35.45 cfs developed by 5280 feet of 36" penstock, with an estimated net head of 989 feet. In this example, a "Pelton turbine" micro hydroelectric turbine 22 from Canyon Hyrdo of Deming, Washington USA can be used with a 24" ball type turbine inlet valve with gear operator, 24" restrained dismantling joint, Canyon Hydro dual nozzle horizontal Pelton turbine with hydraulic actuation, 2700kW-4160VAC-600RPM synchronous generator, hydraulic power unit, switchgear and controls panels for automated grid parallel operation and structural steel equipment mounting frames. Expected system output from this micro hydroelectric turbine 22, under the design conditions above, is 2511 kW.

In another example, with a 2000 Ft. Elevation loss with 2 miles from the top of the pipeline route to the bottom of the pipeline route where turbine 22 and pump station 26 will reside; with a design flow of 35.45 cfs developed by 10,560 feet of 36" penstock, with an estimated net head of 1979 feet. In this example, a "Pelton turbine" micro hydroelectric turbine 22 from Canyon Hyrdo of Deming, Washington USA can be used with a 24" ball type turbine inlet valve with gear operator, 24" restrained dismantling joint, Canyon Hydro dual nozzle horizontal Pelton turbine with hydraulic actuation, 5400kW-4160VAC-900RPM synchronous generator, hydraulic power unit, switchgear and controls panels for automated grid parallel operation and structural steel equipment mounting frames. Expected system output, from this micro hydroelectric turbine 22 under the design conditions above, is 5025 kW.

In another example, with a 3000 Ft. Elevation loss with 3 miles from the top of the pipeline route to the bottom of the pipeline route where turbine 22 and pump station 26 will reside; with a design flow of 35.45 cfs developed by 15,840 feet of 36" penstock, with an estimated net head of 2969 feet. In this example, a "Pelton turbine" micro hydroelectric turbine 22 from Canyon Hyrdo of Deming, Washington USA can be used with a 24" ball type turbine inlet valve with gear operator, 24" restrained dismantling joint, Canyon Hydro dual nozzle horizontal Pelton turbine with hydraulic actuation, 7800kW-4160VAC-1200RPM synchronous generator, hydraulic power unit, switchgear and controls panels for automated grid parallel operation and structural steel equipment mounting frames. Expected system output from this micro hydroelectric turbine 22, under the design conditions above, is 7535 kW.

Figure 4:
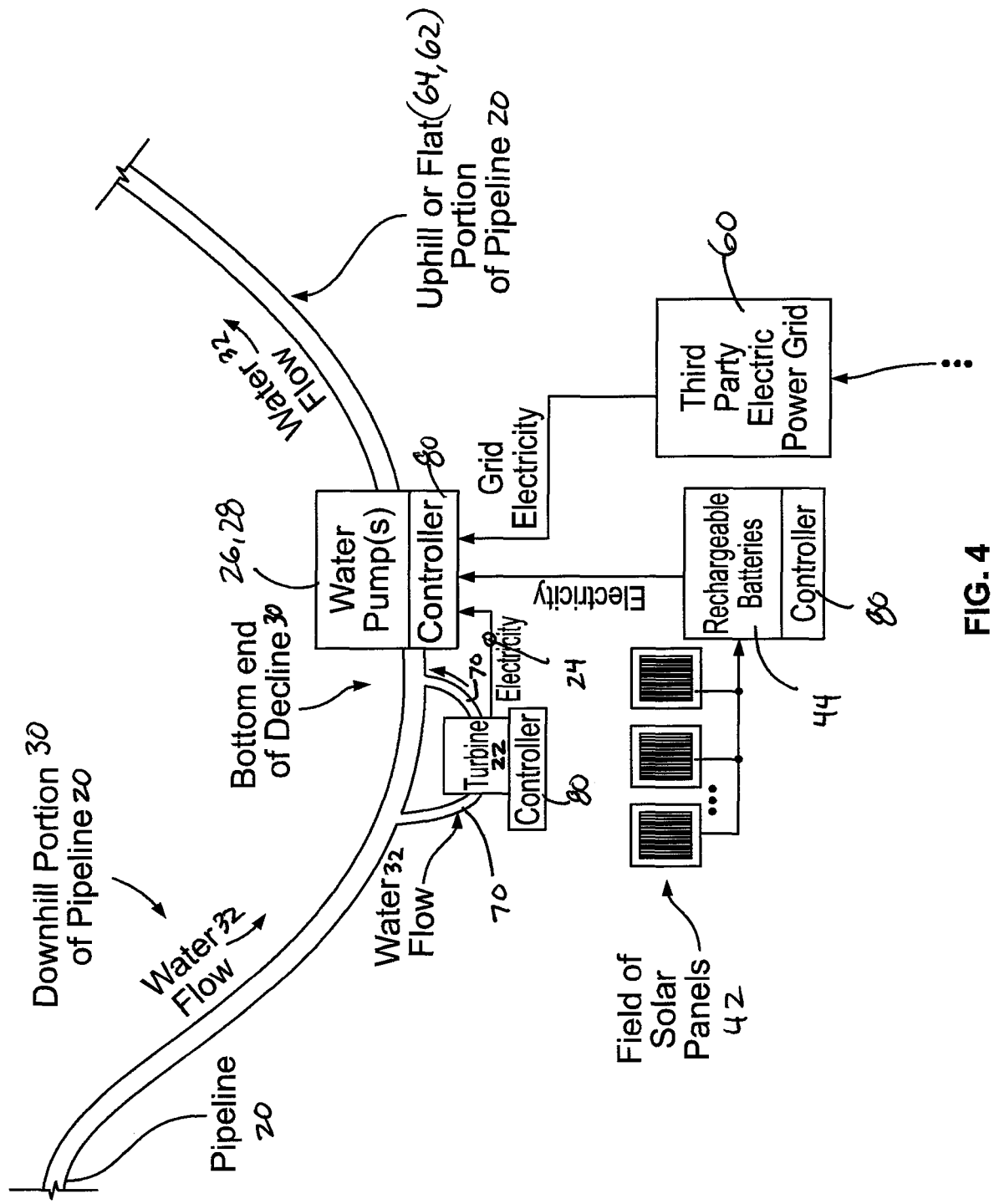
FIG. 4 illustrates another example block diagram of a system for transporting water from a first location with a water source such as a river (or other water source) to a second location such as water storage reservoir while reducing the electricity used from a third-party electrical power grid, in accordance with various embodiments of the present disclosure.

In another embodiment and referring to FIG. 4, one 36-inch pipeline flows downhill into one large turbine 22 positioned at the bottom of the downhill 30, with the turbine 22 positioned adjacent to the pipeline 20 in order to generate sufficient kW for any large pump system 20. The water flows back into a pumping station 26 via piping once it travels through the turbine 22. The turbine 22 is connected to the water pump 28 via electrical wiring 24 using converters and controllers 80 that allow the electricity generated by the turbine 22 to power the connected water pumps 28. As described herein, additional electricity is generated by solar photovoltaic cell farms 42 and rechargeable battery storage/backups 44 nearby the water pump 28, and the solar farms/batteries are connected via electrical wiring using converters and controllers 80 that allow the electricity generated to help power the connected water pumps 28. The water pump 28 is also electrically connected to the outside third-party electrical grid 60 to provide any additional electricity/power to the water pump 28 as needed.

Figure 5:
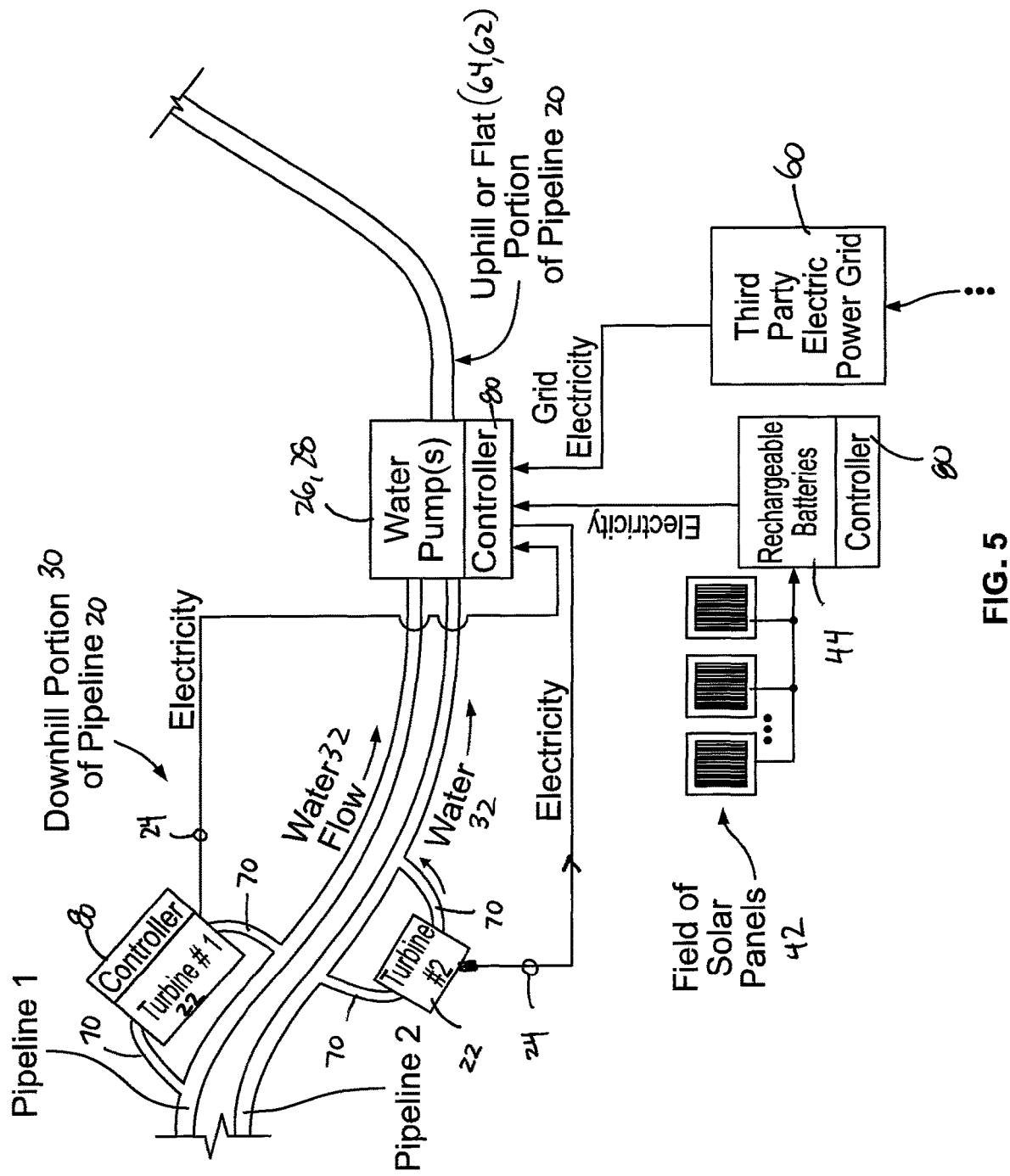
FIG. 5 illustrates block diagram of a system for transporting water from a first location with a water source such as a river (or other water source) to a second location such as water storage reservoir while reducing the electricity used from a third-party electrical power grid, in accordance with various embodiments of the present disclosure.

In another embodiment and referring to FIG. 5, two 36" pipelines 20 flow downhill into two large turbines 22 that are adjacent to the pipeline 20 in order to generate sufficient kW for any large water pump system 26 having one or more water pumps 28. The water 32 flows back into a pumping station 26 via piping 70 once it travels through the two turbines 22. The two turbines 22 are connected to the water pump(s) 28 via electrical wiring 24 using converters and controllers 80 that allow the electricity generated to help power the connected water pump(s) 28.

In the embodiments of FIGS. 1-6, if desired, one or more solar photovoltaic cell farms 42 with one or more rechargeable batteries/battery storage/backup 44 may be provided to generate additional electricity. In one example, the soler photovoltaic cell farms 42 and rechargeable storage/backup batteries 44 may be positioned nearby the water pump 28. The solar cell farms 42 and rechargeable batteries 44 are also connected via electrical wiring 24 using converters and controllers 80 that allow the electricity generated by the solar cell farms 42 to help power the connected water pump(s) 28. The water pump(s) 28 are also electrically connected to the outside third-party electrical grid 60 to provide any additional electricity/power to the water pump(s) 28 as needed.

In the embodiments of FIGS. 1-6, one or more controllers 80 may be provided with the turbines 22, solar cell farms 42/wind turbines 40/rechargeable batteries 44, and/or the water pumps 28. One or more controllable switches, relays, regulators 82 or other controls can be provided and controlled by the one or more controllers 80, to regulate the amount of electricity/power drawn from the third-party electrical power grid 60 to power the water pumps 28.

In one example, one or more of these controllers 80 are programmed to monitor in real-time the electrical demands of the water pump 28, the amounts of electricity being generated by each of the turbines 22, the amounts of electricity available from the solar cell farms 42 (if present) and the wind turbines 40 (if present) and battery storage/backup 44 (if present). In one example, one or more of the controllers 80 determine if the real-time electrical demands of the water pump 28 can be provided by the electricity generated from the turbines 22, and if so, then no electricity is drawn from the third-party electrical grid 60 to power the water pump(s) 28. If the controller 80 determines that additional electricity (above the amount being provided by the turbines 22) is needed to power the water pump(s) 28, the controller 80 can direct electrical energy from the solar cell farms 42/wind turbines 40/battery storage/backup 44 to provide supplemental energy into the water pumps 28. If the controller 80 determines that additional electricity (above the amount being provided by the turbines 22 and above the amount available from the solar cell farms 42/wind turbines 40/battery storage/backup 44) is needed to power the water pump(s) 28, the controller 80 can direct (such as through the switches/relays/regulators 82 shown in the example of FIG. 3) electrical energy from the third-party electrical grid 60 to provide additional electrical energy/power into the water pumps 28.

In this manner, the controller 80 directs the electricity/power available from the turbines 22 and solar cell farms 42/wind turbines 40/battery storage/backup 44 into the water pump(s) 28—and if additional electricity is needed to power the water pumps 28, the controller 80 directs that such additional electricity is drawn from the electrical grid 60.

Figure 6:
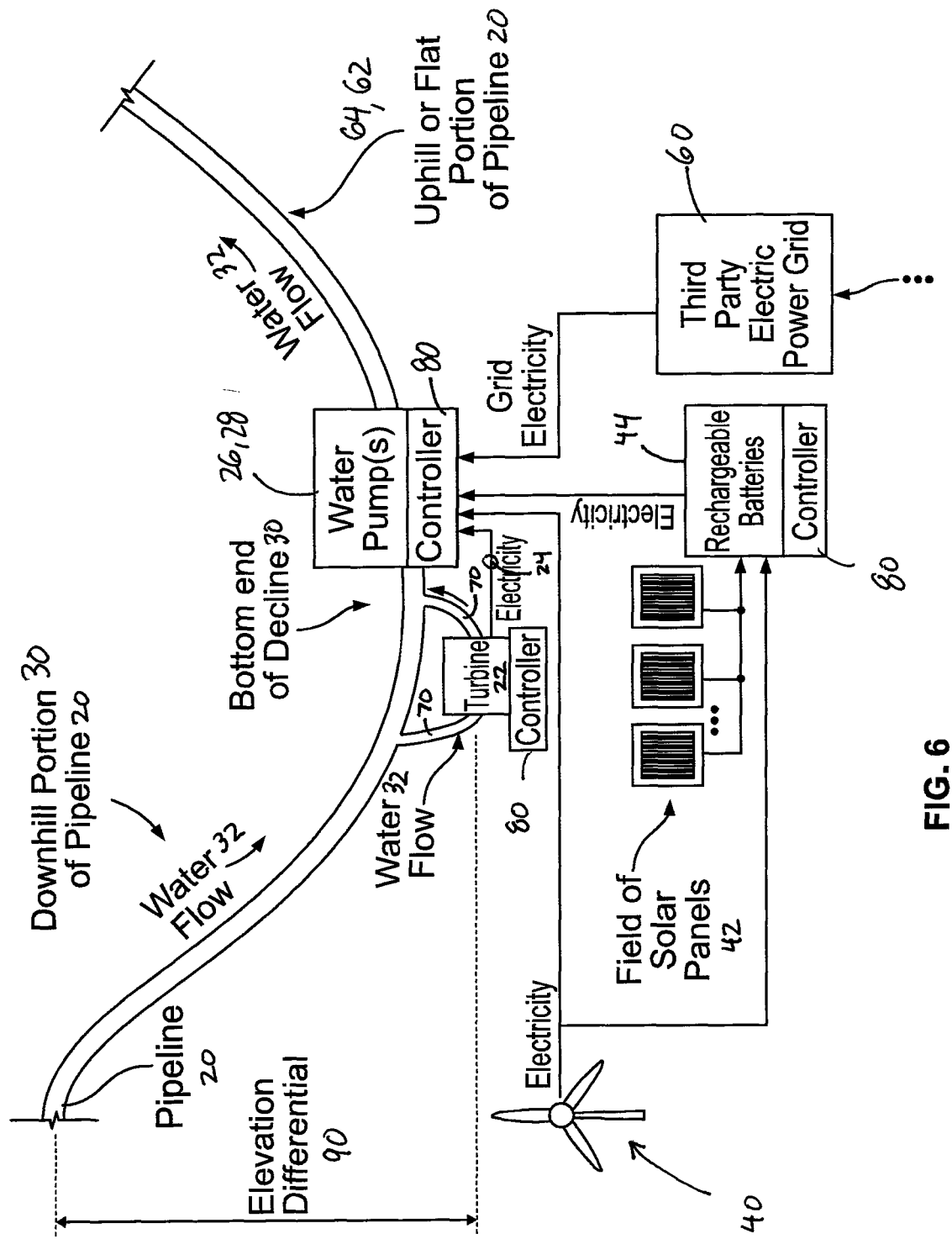
FIG. 6 illustrates another example block diagram of a system for transporting water or fluids from a first location to a second location while reducing the electricity used from a third-party electrical power grid, where there is an elevation differential from the first location to the micro-turbine, and where one or more wind turbines and/or solar panels with battery storage may optionally be included in the system to generate additional electricity to power the water pumps, in accordance with various embodiments of the present disclosure.

In the embodiment of FIG. 6, a pipeline 20 flows downhill 30 (with an Elevation Differential 90 as shown in FIG. 6) into a turbine 22 positioned at or near the bottom of the downhill 30, with the turbine 22 positioned adjacent to the pipeline 20 in order to generate sufficient kW for any large water pump system 28. The water flows back into a pumping station 26 via piping 70 once it travels through the turbine 22. The turbine 22 is connected to the water pump 28 via electrical wiring 24 using converters and controllers 80 that allow the electricity generated by the turbine 22 to power the connected water pumps 28. Moreover, one or more wind turbines 40 may also be included to generate additional electricity to power the pumps 28 in the pump station 26 to pump and move the water/fluids 32 along to the second location 52. The wind turbines 40 may also be coupled with the rechargeable battery storage 44, which store electrical energy generated by the wind turbines 40, and such stored electrical energy can be used to provide electricity to the pumps 28. Solar panels 42 with battery storage 44 may also be included to generate additional electricity to power the pumps 28 in the pump station 26 to pump and move the water/fluids 32 along to the second location 52. The wind turbines 40 and/or solar panels 42/batteries 44 may be connected via electrical wiring 24 using converters and controllers 80 that allow the electricity generated to help power the connected pumps 28. The water pumps 28 are also electrically connected to the outside third-party electrical grid 60 to provide any additional electricity/power to the water pumps 28 as needed.

While every system implemented using embodiments of the present disclosure will have different specifications and energy output, the following examples illustrate the electricity displacement or reduction from the external electric power grid 60 that can be achieved using embodiments of the present disclosure. It is understood that the following examples are provided as illustrative and are not limiting, in that various implementations of the present disclosure are possible with differing values and parameters.

In one example of FIG. 6 where the Elevation Differential 90 is 500 feet from the water source to the turbine 22, with a design flow of 35.45 cubic feet per second (cfs) developed by 2,640 feet of 36" penstock, the turbine 22 illustrated in FIG. 6 may be designed to produce approximately 1,255 kW under these conditions. This can displace or reduce approximately 1,255 kW needed from the external electric power grid 60 for the water pump system 28. The solar array 42 with battery storage 44 is designed to provide sufficient electricity during down time of the hydro turbine 22. If desired, a wind turbine 40 can be added to the system to also provide electricity into the water pumps 28, to further reduce the amount of electricity that would otherwise be drawn from the electric power grid 60, for instance in the amount of 650 kW generated by the wind turbine 40.

In another example of FIG. 6 where the Elevation Differential 90 is 1,000 feet from the water source to the turbine 22, with a design flow of 35.45 cfs developed by 5,280 feet of 36" penstock, the turbine 22 illustrated in FIG. 6 may be designed to produce approximately 2,511 kW under these conditions. This can displace or reduce approximately 2,511 kW needed from the external electric power grid 60 for the water pump system 28. The solar array 42 with battery storage 44 is designed to provide sufficient electricity during down time of the hydro turbine 22. If desired, a wind turbine 40 can be added to the system to also provide electricity into the water pumps 28, to further reduce the amount of electricity that would otherwise be drawn from the electric power grid 60, for instance in the amount of 650 kW generated by the wind turbine 40.

In another example of FIG. 6 where the Elevation Differential 90 is 2,000 feet from the water source to the turbine 22, with a design flow of 35.45 cfs developed by 10,560 feet of 36" penstock, the turbine 22 illustrated in FIG. 6 may be designed to produce approximately 5,025 kW under these conditions. This can displace or reduce 5,025 kW needed from the external electric power grid 60 for the water pump system 28. The solar array 42 with battery storage 44 is designed to provide sufficient electricity during down time of the hydro turbine 22. If desired, a wind turbine 40 can be added to the system to also provide electricity into the water pumps 28, to further reduce the amount of electricity that would otherwise be drawn from the electric power grid 60, for instance in the amount of 650 kW generated by the wind turbine 40.

In another example of FIG. 6 where the Elevation Differential 90 is 3,000 feet from the water source to the turbine 22, with a design flow of 35.45 cfs developed by 15,840 feet of 36" penstock, the turbine 22 illustrated in FIG. 6 may be designed to produce approximately 7,535 kW under these conditions. This can displace or reduce approximately 7,535 kW needed from the external electric power grid 60 for the water pump system 28. The solar array 42 with battery storage 44 is designed to provide sufficient electricity during down time of the hydro turbine 22. If desired, a wind turbine 40 can be added to the system to also provide electricity into the water pumps 28, to further reduce the amount of electricity that would otherwise be drawn from the electric power grid 60, for instance in the amount of 650 kW generated by the wind turbine 40.

Hence, it can be seen that embodiments of the present disclosure provide various systems and methods for reducing the amount of electricity used from third-party electrical grids 60 to power the transport of water or fluids 32 through pipelines 20.

In this description, references to "one embodiment" or "an embodiment," or to "one example" or "an example" mean that the feature being referred to is, or may be, included in at least one embodiment or example of the disclosure. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present disclosure includes a variety of combinations and/or integrations of the embodiments and examples described herein, as well as further embodiments and examples as defined within the scope of all claims based on this disclosure, as well as all legal equivalents of such claims.

While the methods disclosed herein have been described and shown with reference to particular operations performed in a particular order, it will be understood that these operations may be combined, sub-divided, or re-ordered to form equivalent methods without departing from the teachings of the present disclosure. Accordingly, unless specifically indicated herein, the order and grouping of the operations is not a limitation of the present disclosure.

It should be appreciated that in the foregoing description of exemplary embodiments of the disclosure, various features of the disclosure are sometimes grouped together in a single embodiment, figure, or description thereof for the purpose of streamlining the disclosure and aiding in the understanding of one or more of the various aspects. This method of disclosure, however, is not to be interpreted as reflecting an intention that an embodiment requires more features than are expressly recited in each claim. Rather, inventive aspects lie in less than all features of a single foregoing disclosed embodiment, and each embodiment described herein may contain more than one inventive feature.

It will be understood by those skilled in the art that various changes in the form and details may be made from the embodiments shown and described without departing from the spirit and scope of the disclosure.

The invention claimed is:

1. A system for providing renewable electrical power for transporting water from a first location to a second location through a water pipeline having one or more pumps operating with an electrical power grid, comprising:
    at least one micro-turbine fluidly coupled with the water pipeline, wherein the micro-turbine is located along a down-sloped portion of the pipeline, the micro-turbine generating electricity as water passes through the micro-turbine, the micro-turbine having an electrical output coupled with the one or more pumps to provide electricity to the one or more pumps; and
    a controller coupled with the micro-turbine, the controller monitoring the electrical demands of the one or more pumps, the controller monitoring the electrical output of the micro-turbine, and if power is available from the micro-turbine, the controller directing power from the micro-turbine to the one or more pumps to pump the water through the one or more pumps towards the second location thereby reducing an amount of electricity consumed from the electrical power grid.

2. The system of claim 1, wherein the micro-turbine is positioned in-line within the pipeline.

3. The system of claim 1, wherein the micro-turbine is positioned in parallel with the pipeline and the micro-turbine is fluidly coupled with the pipeline.

4. The system of claim 1, wherein the micro-turbine is located near a bottom end of the down-sloped portion of the pipeline.

5. The system of claim 1, further comprising:
    one or more solar panels; and
    one or more rechargeable batteries receiving and storing the electrical power generated by the solar panels, the one or more rechargeable batteries having an output;
    wherein the output of the batteries is electrically coupled with the one or more pumps to provide electricity stored from the one or more solar panels to the one or more pumps.

6. The system of claim 1, further comprising:
    one or more wind turbines; and
    one or more rechargeable batteries receiving and storing the electrical power generated by the wind turbines, the one or more rechargeable batteries having an output;
    wherein the output of the batteries is electrically coupled with the one or more pumps to provide electricity stored from the wind turbines to the one or more pumps.

7. The system of claim 1, further comprising:
    one or more solar panels;
    one or more wind turbines; and
    one or more rechargeable batteries receiving and storing the electrical power generated by the solar panels and the wind turbines, the one or more rechargeable batteries having an output;
    wherein the output of the batteries is electrically coupled with the one or more pumps to provide electricity stored from the wind turbines and the solar panels to the one or more pumps.

8. The system of claim 1, wherein the water pipeline and pumps are part of a water reservoir.

9. The system of claim 1, wherein the water pipeline and pumps are part of a water treatment system.

10. The system of claim 1, wherein the water pipeline and pumps are part of a sewage system.

11. A method for providing renewable electrical power for transporting water from a first location to a second location through a water pipeline having one or more pumps operating with an electrical power grid, comprising:

providing at least one micro-turbine fluidly coupled with the water pipeline;

positioning the micro-turbine along a down-sloped portion of the pipeline;

connecting an electrical output of the micro-turbine to the one or more pumps;

generating electricity within the micro-turbine as water passes through the micro-turbine; and monitoring the electrical demands of the one or more pumps; and if power is available from the micro-turbine, directing power from the micro-turbine to the one or more pumps to pump the water through the one or more pumps towards the second location thereby reducing an amount of electricity consumed from the electrical power grid.

12. The method of claim 11, wherein the providing operation positions the micro-turbine in-line within the pipeline.

13. The method of claim 11, wherein the providing operation positions the micro-turbine in parallel with the pipeline and fluidly couples the micro-turbine with the pipeline.

14. The method of claim 11, wherein the positioning operation locates the micro-turbine near a bottom end of the down-sloped portion of the pipeline.

15. The method of claim 11, further comprising:

providing one or more solar panels;

providing one or more rechargeable batteries configured to receive and store electrical power generated by the solar panels, the one or more rechargeable batteries having an output; and electrically coupling the output of the batteries with the one or more pumps to provide electricity stored from the one or more solar panels to the one or more pumps.

16. The method of claim 11, further comprising:

providing one or more wind turbines;

providing one or more rechargeable batteries configured to receive and store electrical power generated by the wind turbines, the one or more rechargeable batteries having an output; and electrically coupling the output of the batteries with the one or more pumps to provide electricity stored from the wind turbines to the one or more pumps.

17. The method of claim 11, further comprising:

providing one or more solar panels;

providing one or more wind turbines;

providing one or more rechargeable batteries configured to receive and store electrical power generated by the solar panels and the wind turbines, the one or more rechargeable batteries having an output; and electrically coupling the output of the batteries with the one or more pumps to provide electricity stored from the wind turbines and the solar panels to the one or more pumps.

18. The method of claim 11, wherein the water pipeline and pumps are part of a water reservoir.

19. The method of claim 11, wherein the water pipeline and pumps are part of a water treatment system.

20. The method of claim 11, wherein the water pipeline and pumps are part of a sewage system.

* * * * *